United States Patent
Yan et al.

(10) Patent No.: US 7,958,125 B2
(45) Date of Patent: Jun. 7, 2011

(54) CLUSTERING AGGREGATOR FOR RSS FEEDS

(75) Inventors: Jun Yan, Beijing (CN); Ning Liu, Beijing (CN); Lei Ji, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 443 days.

(21) Appl. No.: 12/146,481

(22) Filed: Jun. 26, 2008

(65) Prior Publication Data

US 2009/0327320 A1   Dec. 31, 2009

(51) Int. Cl.
*G06F 7/00* (2006.01)
*G06F 17/30* (2006.01)

(52) U.S. Cl. .................. 707/737; 707/748; 707/750

(58) Field of Classification Search .................. 707/726, 707/727, 737, 738, 740, 748–750
See application file for complete search history.

(56) References Cited

U.S. PATENT DOCUMENTS

| | | | | |
|---|---|---|---|---|
| 5,819,258 | A * | 10/1998 | Vaithyanathan et al. | 707/692 |
| 7,340,674 | B2 * | 3/2008 | Newman | 715/234 |
| 7,389,306 | B2 * | 6/2008 | Schuetze et al. | 707/602 |
| 7,499,934 | B2 * | 3/2009 | Zhang et al. | 1/1 |
| 7,685,201 | B2 * | 3/2010 | Zeng et al. | 707/748 |
| 7,720,870 | B2 * | 5/2010 | Barbosa et al. | 707/796 |
| 7,844,566 | B2 * | 11/2010 | Wnek | 706/55 |
| 2005/0165743 | A1 | 7/2005 | Bharat et al. | |
| 2005/0198160 | A1 * | 9/2005 | Shannon et al. | 709/206 |
| 2006/0020662 | A1 * | 1/2006 | Robinson | 709/203 |
| 2006/0173985 | A1 | 8/2006 | Moore | |
| 2006/0253459 | A1 | 11/2006 | Kahn et al. | |
| 2007/0027932 | A1 | 2/2007 | Thibeault | |
| 2007/0214477 | A1 | 9/2007 | Read | |
| 2007/0226207 | A1 | 9/2007 | Tawde | |
| 2007/0260586 | A1 | 11/2007 | Savona et al. | |
| 2008/0021963 | A1 | 1/2008 | Jana et al. | |
| 2008/0021976 | A1 | 1/2008 | Chen et al. | |
| 2009/0083023 | A1 * | 3/2009 | Foster et al. | 704/3 |
| 2009/0112588 | A1 * | 4/2009 | Kummamuru et al. | 704/245 |
| 2009/0210407 | A1 * | 8/2009 | Freire et al. | 707/5 |

OTHER PUBLICATIONS

Arrington, Michael et al., "Mixx To Cluster Related Stories—Digg Should Have Done This", Feb. 19 2008, 12 Pages.
"POPURLS Aggregator Saves You Time", (Retrieved on Feb. 27, 2008). http://leadinspectors.blogspot.com/2008/02/popurls-aggregator-saves-you-time.html.
"Blog Flux Services", 1999. http://www.blogflux.com/.

* cited by examiner

*Primary Examiner* — Don Wong
*Assistant Examiner* — Merilyn P Nguyen
(74) *Attorney, Agent, or Firm* — L. Alan Collins; Collins & Collins Incorporated

(57) ABSTRACT

A method for merging really simple syndication (RSS) feeds. Stories containing one or more terms may be merged into one or more clusters based on one or more links between the stories. A cluster frequency with which the terms occur in each cluster may be determined. A diameter for each cluster may be determined. A cluster that is most similar to one of the clusters may be determined based on the cluster frequency. The most similar cluster with the one of the clusters may be determined based on each diameter, and each cluster frequency.

18 Claims, 6 Drawing Sheets

CLUSTERING AGGREGATOR FOR RSS FEEDS

BACKGROUND

Weblogs, also known as blogs, are attracting a lot of attention due to the rapid growth of really simple syndication (RSS) technology. A powerful feature of RSS is that users may subscribe to their favorite blogs through RSS feeds. RSS feeds provide users details about updates to blogs, without the user having to actually visit the blogs. Today, about 11%, or about 50 million Internet users are regular blog readers. Approximately 75,000 new RSS feeds and 1.2 million new stories are posted daily.

SUMMARY

Described herein are implementations of various technologies for a clustering aggregator for really simple syndication (RSS) feeds. In one implementation, a pool of uniform resource identifiers (URIs) is aggregated from users that subscribe to RSS feeds, and the URIs are aggregated from a number of popular RSS feeds. The RSS feeds may be crawled periodically to determine content that is updated between crawls.

The updated content may also be aggregated, and then organized within a hierarchy based on topical relationships between the different items, or stories, of the aggregated content. The hierarchy may contain several levels of clusters. At the bottom level of the hierarchy, the clusters may include stories that are topically related to each other. At higher levels of the hierarchy, the clusters may contain lower level clusters that are topically related.

The hierarchy may, in turn, be analyzed in order to label each cluster with a topic that is appropriate for the cluster. The content of the stories: words, terms, and phrases, may be compared to the content of other stories within the same cluster(s), to determine the appropriate topics.

In another implementation, the cluster hierarchy may be refreshed to account for shifts in the topics discussed, described, or contained within the stories for the RSS feeds. In refreshing the cluster hierarchy, stories that age beyond a time window may be purged, and the cluster may be reorganized according to the remaining stories.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As to terminology, any of the functions described with reference to the figures can be implemented using software, firmware, hardware (e.g., fixed logic circuitry), manual processing, or a combination of these implementations. The term "logic," "module," "component," or "functionality" as used herein generally represents software, firmware hardware, or a combination of these implementations. For instance, in the case of a software implementation, the term "logic," "module," "component," or "functionality" represents program code (or declarative content) that is configured to perform specified tasks when executed on a processing device or devices (e.g., CPU or CPUs). The program code can be stored in one or more computer readable media.

More generally, the illustrated separation of logic, modules, components and functionality into distinct units may reflect an actual physical grouping and allocation of such software, firmware, and/or hardware, or may correspond to a conceptual allocation of different tasks performed by a single software program, firmware program, and/or hardware unit. The illustrated logic, modules, components, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, solid state, etc.). The term machine-readable media also encompasses transitory forms of representing information, including various hardwired and/or wireless links for transmitting the information from one point to another.

The techniques described herein are also described in various flowcharts. To facilitate discussion, certain operations are described in these flowcharts as constituting distinct steps performed in a certain order. Such implementations are exemplary and non-limiting. Certain operations can be grouped together and performed in a single operation, and certain operations can be performed in an order that differs from the order employed in the examples set forth in this disclosure.

Figure 1:
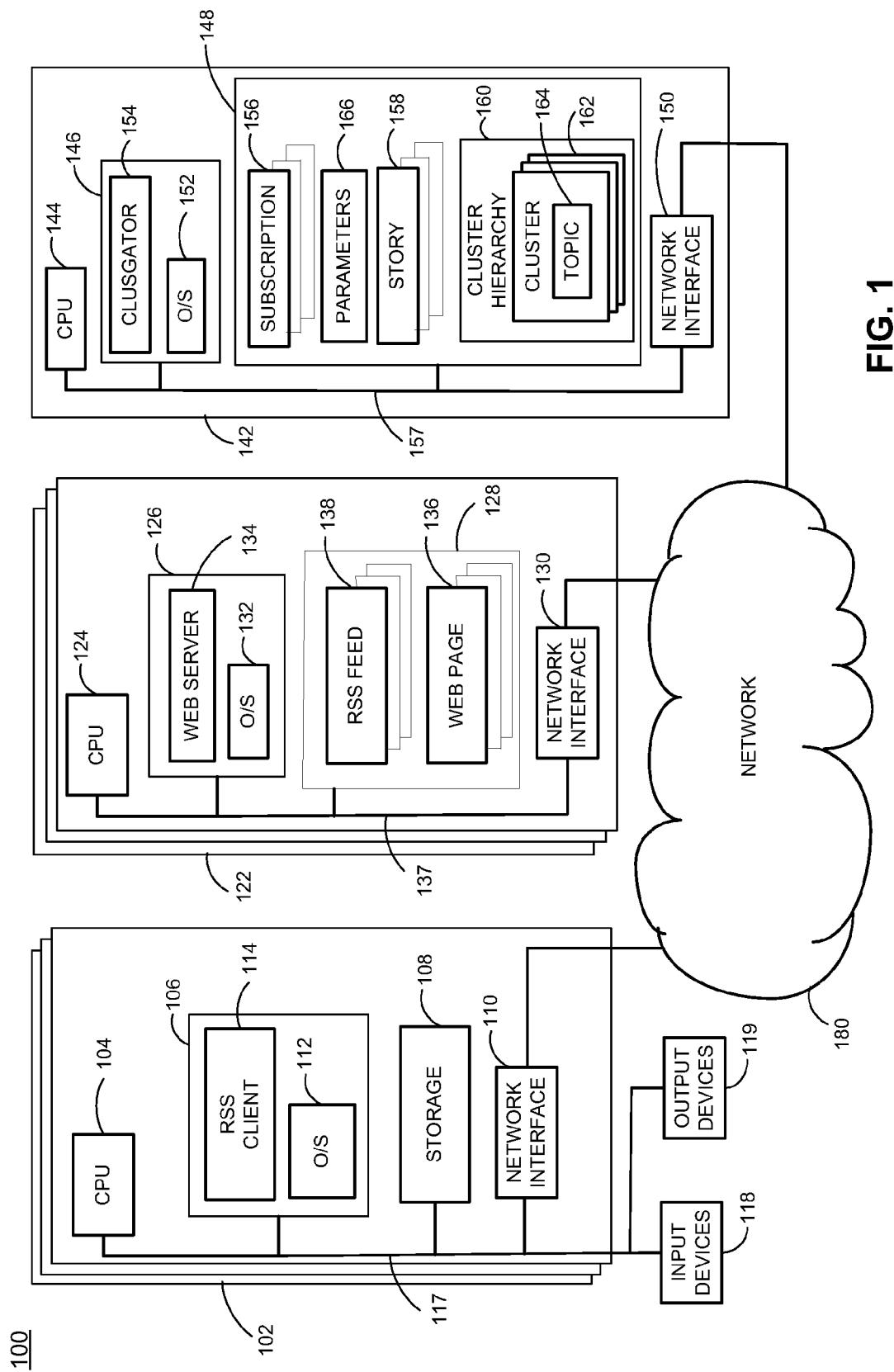
FIG. 1 illustrates a schematic diagram of a computing system in which the various technologies described herein may be incorporated and practiced.

FIG. 1 illustrates a schematic diagram of a computing system 100 in which the various technologies described herein may be incorporated and practiced. Although the computing system 100 may include conventional desktop or server computers, other computer system configurations may be used.

The computing system 100 may include one or more client computers 102, one or more web servers 122, and an aggregator server 142. The client computer 102 may provide a user with an interface through which the user may read content that is provided via really simple syndication (RSS) feeds 138. The RSS feeds 138 are described in greater detail in the paragraphs below.

Each of the web servers 122 may host one or more websites. A website may be a collection of content, such as web pages 136, images, videos or other digital assets accessible via the Internet. The web servers 122 may record updates to website content in the RSS feeds 138.

The aggregator server 142 may aggregate the RSS feeds 138 into a central location for access by the user on the client computer 102. The aggregator server 142 may further organize content described in the RSS feeds 138 to provide topical information about the content to the user.

The web server 122 may include a central processing unit (CPU) 124, a system memory 126, a storage 128, a network interface 130, and a system bus 137 that couples various system components to the CPU 124. Although only one CPU 124 is illustrated in the web server 122, it should be understood that in some implementations the web server 122 may include more than one CPU 124.

The system bus 137 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 126 may include a read only memory (ROM), a random access memory (RAM), and a basic input/output system (BIOS) (none of which are shown). The BIOS may contain the basic routines that help transfer information between elements within the web server 122, such as during start-up.

The storage 128 may include a hard disk drive for reading from and writing to a hard disk, a magnetic disk drive for reading from and writing to a removable magnetic disk, and an optical disk drive for reading from and writing to a removable optical disk, such as a CD ROM or other optical media. The hard disk drive, the magnetic disk drive, and the optical disk drive may be connected to the system bus 137 by a hard disk drive interface, a magnetic disk drive interface, and an optical drive interface, respectively. The drives and their associated computer-readable media may provide nonvolatile storage of computer-readable instructions, data structures, program modules and other data for the web server 122. Neither the drives nor their respective interfaces are shown in FIG. 1.

Although the web server 122 is described herein as having a hard disk, a removable magnetic disk, and/or a removable optical disk, it should be appreciated by those skilled in the art that the web server 122 may also include other types of computer-readable media that may be accessed by a computer. For example, such computer-readable media may include computer storage media and communication media.

Computer storage media may include volatile and nonvolatile, and removable and non-removable media implemented in any method or technology for storage of information, such as computer-readable instructions, data structures, program modules or other data.

Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the web server 122.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal.

By way of example, and not limitation, communication media may include wired media such as a wired network or direct-wired connection, and wireless media such as acoustic, RF, infrared and other wireless media. Combinations of any of the above may also be included within the scope of computer readable media.

Further, the web server 122 may operate in a networked environment using logical connections to one or more remote computers, such as the client computer 102, and the aggregator server 142. The logical connections may include the network interface 130, connected to a network 180. The network 180 may be any network or collection of networks, such as enterprise-wide computer networks, intranets, local area networks (LAN), and wide area networks (WAN). In one implementation, the network 180 may be the Internet.

A number of program or data modules may be stored in the system memory 126 and the storage 128. More specifically, the storage 128 may include the web pages 136 and the RSS feed 138.

The RSS feed 138 may include descriptions of recent updates to the web pages 136. Updates may include new web pages 136, or additions to existing web pages 136. The RSS feed 138 may contain a title, a description, and a uniform resource identifier of the updated content. In one implementation, the RSS feed 138 may contain the text of the updated content. The updated content may be described within the RSS feed 138 in a standardized extensible markup language (XML) file format.

It should be noted that the RSS feed 138 is merely one example of a format of syndicated feeds (also known as web feeds). Any data format may be used that provides users with information about frequently updated content, whether provided on the Internet or another network.

Additionally, the system memory 126 may include an operating system 132, and a web server application 134. The operating system 132 may be any suitable operating system that may control the operation of a networked personal or server computer, such as Windows® Vista, Mac OS® X, Unix-variants (e.g., Linux® and BSD®), and the like.

The web server application 134 may be a computer program that is responsible for accepting hypertext transfer protocol (HTTP) requests from web clients, such as an RSS client 114. The web server application 134 may then provide HTTP responses that include data content. The data content may include the web pages 136, and/or the RSS feeds 138 that the RSS client 114 displays for the user.

The aggregator server 142 may be constructed similarly to the web server 122. The aggregator server 142 may include a central processing unit (CPU) 144, a system memory 146, a storage 148, a network interface 150, and a system bus 157 that couples various system components to the CPU 144.

A number of program modules and data may be stored in the system memory 146 and the storage 148. More specifically, the system memory 146 may include an operating system 152 and a clusgator 154. The clusgator 154 may be an application that aggregates and organizes the RSS feeds 138 within stories 158 and a cluster hierarchy 160, respectively.

The clusgator 154 may crawl the RSS feeds 138 and aggregate the updated content within the stories 158. Each story 158 may represent one item of updated content. The stories 158 may include all the information from the RSS feed 138. In one implementation, the stories 158 may include data from the web pages 136 for which the updates are noted in the RSS feeds 138. Such data may include the text of the update, and even hyperlinks within the updated web pages 136.

The storage 148 may include subscriptions 156, the stories 158, the cluster hierarchy 160, and parameters 166. The users may subscribe to the RSS feeds 138 to keep current with updates to frequently visited websites, without having to actually visit the website. The subscriptions 156 may contain one or more users' subscriptions in the form of uniform resource identifiers (URIs) of the websites to which the users subscribe.

The parameters 166 may contain adjustable variables and other data to facilitate the functionalities of the clusgator 154, such as crawling the RSS feeds 138, and organizing the stories 158 into the cluster hierarchy 160.

In one implementation, the parameters 166 may contain URIs of websites not included in the subscriptions 156. In such an implementation, the clusgator 154 may also crawl these additional websites to collect the stories 158. The parameters 166 are described in greater detail with reference to FIGS. 2-7.

The cluster hierarchy 160 may include one or more levels of topically related clusters 162. The clusters 162 may each be described with a topic 164. The lowest level of the cluster hierarchy 160 may include clusters 162 of stories 158. The upper levels of the cluster hierarchy 160 may include clusters 162 of lower level clusters 162.

Each cluster 162 within the cluster hierarchy 160 may group stories 158 or clusters 162 that are topically related to each other. In one implementation, the cluster 162 may only contain one story 158 or one cluster 162, if the story 158 or cluster 162 is not topically related to other stories 158 or clusters 162.

The client computer 102 may also be constructed similarly to the web server 122. The client computer 102 may include a central processing unit (CPU) 104, a system memory 106, a storage 108, a network interface 110, and a system bus 117 that couples various system components to the CPU 104.

Additionally, the user may enter commands and information into the client computer 102 through input devices 118. The input devices 118 may include devices such as a keyboard and pointing device. Other input devices may include a microphone, joystick, game pad, satellite dish, scanner, or the like. These and other input devices 118 may be connected to the CPU 104 through an serial port interface coupled to the system bus 117, but may be connected by other interfaces, such as a parallel port, game port or a universal serial bus (USB).

One or more output devices 119 may also be connected to the system bus 117 via an interface, such as a video adapter. The output devices 119 may include a display monitor, or other peripheral output devices, such as speakers and printers.

A number of program modules may be stored in the system memory 106. More specifically, the system memory 106 may include an operating system 112, and an RSS client 114. The RSS client 114 may be a user interface that provides information about the RSS feeds 138 through the display of the cluster hierarchy 160. Additionally, the RSS client 114 may enable the user to view the stories 158 identified in the cluster hierarchy 160 by providing links to the stories 158 within the displayed cluster hierarchy 160.

In one implementation, the RSS client 114 displays the clusters 162 (and all included stories 158) of the cluster hierarchy 160 that contain the stories 158 from the user's subscribed feeds. Additionally, the RSS client 114 may display the upper level clusters 162 within the cluster hierarchy 160 if more than one lower level cluster 162 within the upper level cluster 162 is displayed. In one implementation, the display of the clusters 162 includes the topic 164 for the cluster 162.

Because one RSS feed 138 may describe different stories 158 within the same website, and each of the stories 158 may be topically distinct, the stories 158 from the same RSS feed 138 may be distributed across several clusters 162. Advantageously, the user may discriminate among stories 158 within a single RSS feed 138 by only viewing stories 158 that are organized into clusters 162 with the topics 164 that interest the user. Additionally, the user may discover new RSS feeds 138 because topically-related stories 158 in other RSS feeds 138 may be displayed within the same cluster 162 of the cluster hierarchy 160 as the stories 158 in the user's subscribed feeds.

Figure 2:
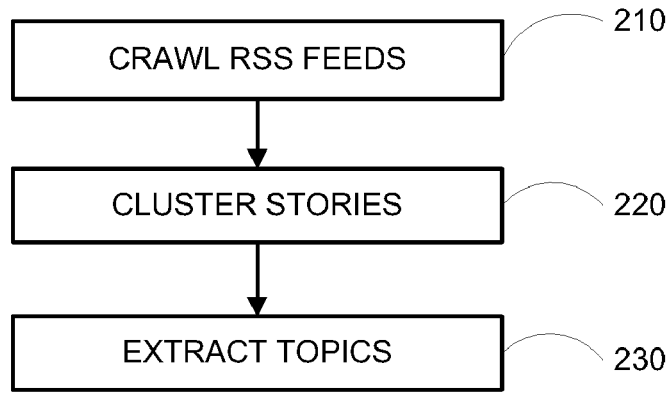
FIG. 2 illustrates a flowchart of a method for creating and maintaining a cluster hierarchy, in accordance with implementations of various technologies described herein.

FIG. 2 illustrates a flowchart of a method 200 for creating and maintaining the cluster hierarchy 160, in accordance with implementations of various technologies described herein. In one implementation, the method 200 may be performed by the clusgator 154.

At step 210, the clusgator 154 may crawl the RSS feeds 138 of the websites whose URIs may be contained in the subscriptions 156 and the parameters 166. When creating the cluster hierarchy 160, the clusgator 154 may perform an initial crawl of the RSS feeds 138 that aggregates updates within a predefined period, such as the prior 3 days. The predefined period may be stored within the parameters 166. When maintaining the cluster hierarchy 160, the clusgator 154 may perform a daily crawl whereby updates within the prior day may be aggregated.

At step 220, the clusgator 154 may cluster the stories 158. Clustering the stories 158 may create the clusters 162 by merging together the stories 158 that are topically related in the lowest level of the cluster hierarchy 160. Merging together the clusters 162 that are topically related may create additional levels of the cluster hierarchy 160. The number of levels within the cluster hierarchy 160 may vary according to the parameters 166 of a particular implementation.

In one implementation, the clusgator 154 may periodically purge the stories 158 that are older than the predefined period, and refresh the cluster hierarchy 160 by clustering the stories 158 aggregated from the crawl with the stories 158 remaining from within the predefined period.

When crawling the RSS feeds 138 only aggregates updates from the prior day, clustering the stories 158 may be an incremental clustering. Incremental clustering may cluster the stories 158 aggregated from the prior day's updates to the lowest level of the existing cluster hierarchy 160. The clustering methods are described in greater detail with reference to FIGS. 3-6. Incremental clustering, specifically, is described with reference to FIG. 6.

At step 230, the clusgator 154 may extract topics 164 for the clusters 162. By extracting the topics 164, the clusgator 154 may provide a descriptive title for each of the clusters 162 within the cluster hierarchy 160. After incremental clustering, only the clusters 162 that are updated to include the stories 158 aggregated from the daily crawl may undergo topic extraction.

Figure 3:
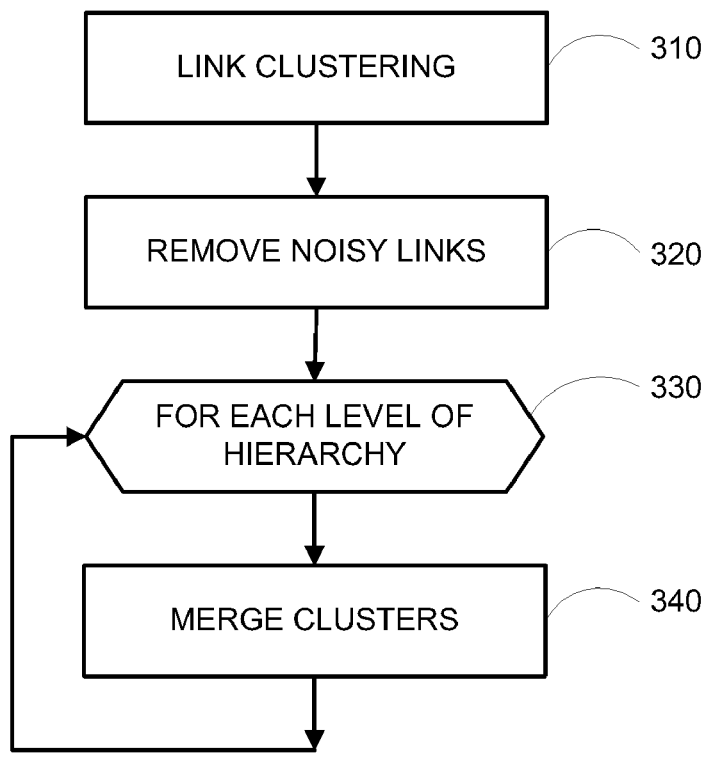
FIG. 3 illustrates a method for creating or refreshing the cluster hierarchy, in accordance with implementations described herein.

FIG. 3 illustrates a method 300 for creating or refreshing the cluster hierarchy 160, in accordance with implementations described herein. At step 310, link clustering may be performed. In link clustering, stories 158 may be merged into the clusters 162 based on links, e.g., hyperlinks, between the stories 158. For example, if a story A contains a hyperlink link to stories B and C, stories A, B, and C may be merged into a single cluster 162.

In contrast to text documents, the stories 158 from RSS feeds 138 may have natural link structure. Though the links may be sparse, the natural link structure may provide a basis for creating an initial set of the clusters 162. Given a set of n stories 158, these stories 158 can be represented by a graph G(V, E), where vertices, V, may represent the stories 158 and edges, E, may represent the links between stories 158. Since the link structure may be highly sparse, the graph, G, may be composed of a set of m connected sub-graphs. Suppose all these m sub-graphs are G={$G_1$, $G_2$, ..., $G_m$}. If graph $G_i$=G($V_i$, $E_i$) has size $n_i$, then it may be that $$\sum_{i=1}^{m} n_i = n.$$

However, the link clustering may create clusters 162 with noisy links. The noisy links may be links between the stories 158 that are not topically related. In other words, the noisy link may merge unrelated stories 158 within the same cluster 162.

At step 320, the clusgator 154 may remove the noisy links. By removing the noisy links, the clusgator 154 may refine the topical relationship between the stories within each of the clusters 162. The method for removing noisy links is described in greater detail with reference to FIG. 4.

Steps 330-340 may be repeated for each level of the cluster hierarchy 160. The link clustering may also present another problem: missing links. The missing links may represent the stories 158 that are topically related, but do not have links between them. In other words, the missing link problem may leave topically related stories 158 in different clusters 162. To resolve the missing links, at step 340, the clusgator 154 may merge the clusters 162 that are topically related.

The first pass of steps 330-340 may address the missing link issue by creating a second level of the cluster hierarchy 160 where the clusters 162 that are topically related are merged. Additional levels within the cluster hierarchy 160 may then be created in subsequent passes whereby the clusters 162 merged in a prior pass may be merged into larger clusters 162. The method for merging clusters 162 is described in greater detail with reference to FIG. 5.

Figure 4:
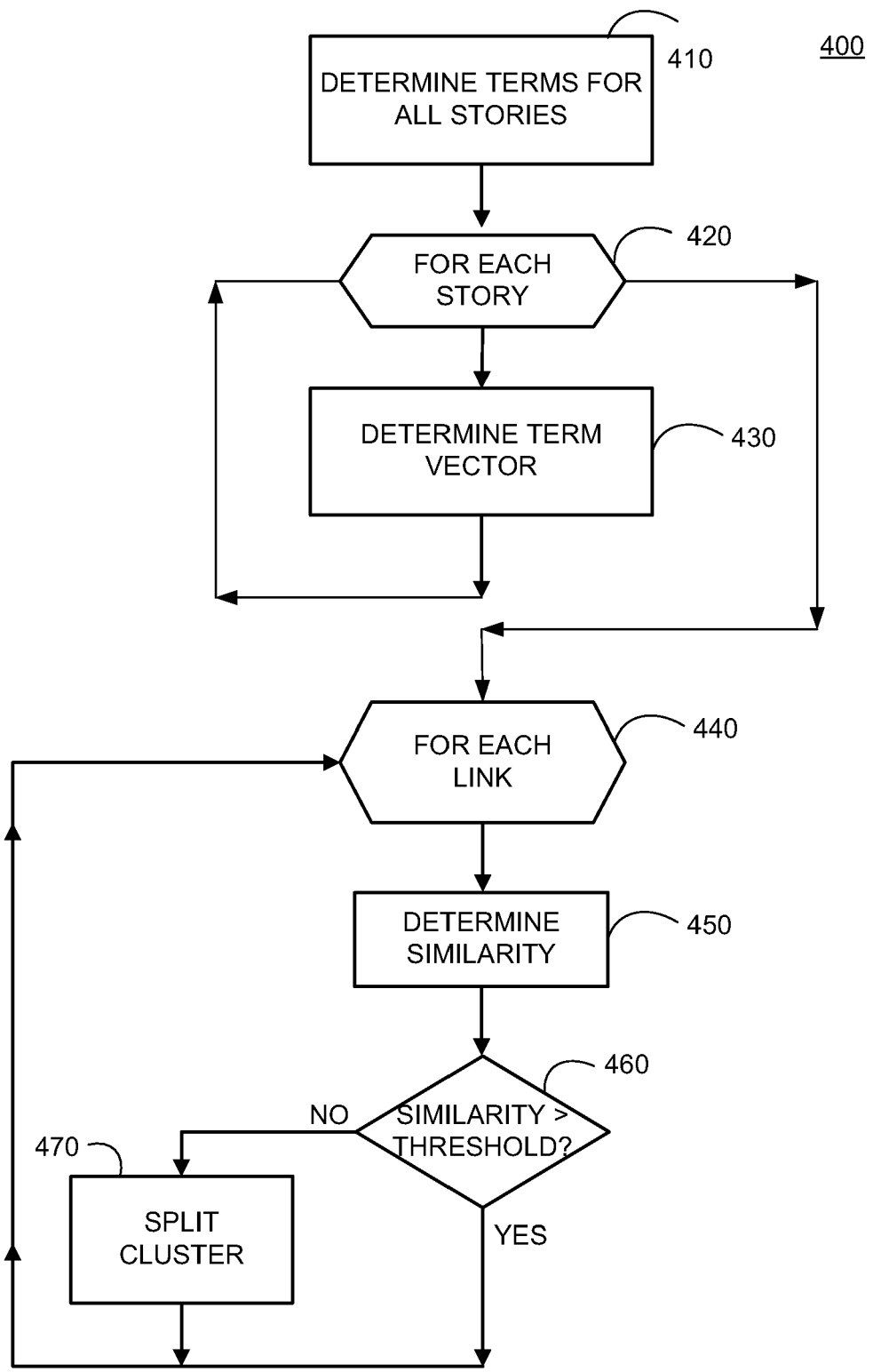
FIG. 4 illustrates a flow chart of a method for removing noisy links from the clusters, in accordance with implementations described herein.

FIG. 4 illustrates a flow chart of a method 400 for removing noisy links from the clusters 162, in accordance with implementations described herein. The method 400 may be performed by the clusgator 154.

At step 410, terms for all of the stories 158 may be determined. The terms may include all the words within the titles and descriptions for the stories 158. The terms may then be pared down by removing stopwords. The terms may also be stemmed.

Steps 420-430 may be repeated for each of the stories 158. At step 430, a vector of weights may be determined for all of the terms. The weights may be assigned according to a Term Frequency and Inverse Document Frequency algorithm.

Steps 440-470 may be repeated for each link between the stories 158. At step 450, the similarity between two linked stories 158 may be determined. In one implementation, the similarity may be determined using a cosine similarity formula, as follows:

$$Sim(v_i, v_j) = \frac{<v_i, v_j>}{\|v_i\| \|v_j\|}$$

where $v_i$ and $v_j$ represent term vectors for stories i and j, respectively, and Sim($v_i$, $v_j$) is the similarity between stories i and j.

At step 460, the similarity may be compared to a global threshold. If the similarity between vectors i and j is less than the global threshold, at step 470, the cluster 162 containing stories i and j may be split. The global threshold may be defined within the parameters 166. In one implementation, the global threshold, $\eta = \alpha \times 0.415$, where $0 < \alpha \leq 1$. In one implementation, $\alpha = 1$. It should be noted that the larger the parameter $\alpha$ is, the more links will be cut. Increasing the value of $\alpha$ may reduce the number of noisy links. However, reducing the number of noisy links may increase the number of clusters 162, thereby incurring greater computational costs for the cluster merging methods.

In another implementation, the global threshold may be determined by producing an average similarity for each of the clusters 162. The average similarity for one cluster 162 may be the average similarity of every link within the cluster 162. In such an implementation, the global threshold may be determined to be the smallest of the average similarities for all the clusters 162.

Figure 5:
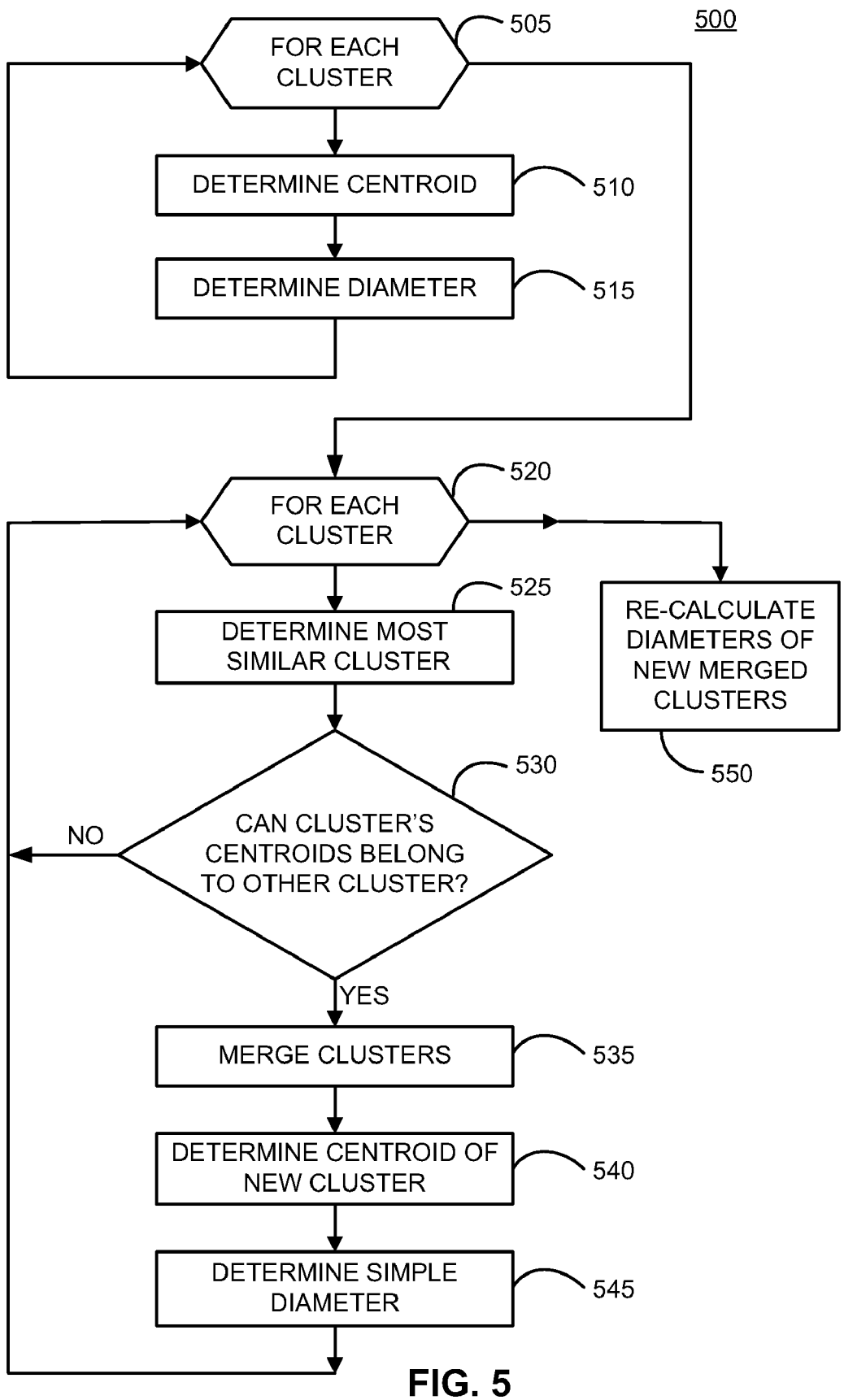
FIG. 5 illustrates a flow chart of a method for merging the clusters, according to implementations of various technologies described herein.

FIG. 5 illustrates a flow chart of a method 500 for merging the clusters 162, according to implementations of various technologies described herein. The method 500 may be performed by the clusgator 154 after the noisy links are removed in the method 400. The method 500 may also be performed recursively to produce multiple levels of clusters 162 within the cluster hierarchy 160.

Steps 505-515 may be repeated for each of the clusters 162 in one level of the cluster hierarchy 160. At step 510, a centroid vector for the cluster 162 may be determined. The centroid vector, also referred to herein as the centroid, may be a term vector for the cluster 162 that contains the average weights of the term vectors for every story 158 in the cluster 162. In other words, the average weight may be the total amount of weights for all the stories 158 in the cluster 162 divided by the total amount of stories 158 in the cluster 162.

At step 515, a diameter, $r_i$, for the cluster 162 may be determined, according to the following formula:

$$r_i = \underset{r}{\mathrm{argmax}} \left\{ \frac{\sum_{j=1}^{n} \gamma(Sim(\delta_i(v_j), c_i) - r)}{n_i} \geq \lambda \right\};$$

where $$\delta_i(v_j) = \begin{cases} 1 & \text{if } v_j \in G_i \\ 0 & \text{else} \end{cases} \text{ and } \gamma(x) = \begin{cases} 1 & \text{if } x > 0 \\ 0 & \text{else} \end{cases}; \text{ and}$$

where $c_i$=the centroid for cluster i, $n_i$=the number of stories 158 in cluster i.

The cluster diameter, $r_i$, may be the maximum similarity with which $100\lambda$ percent of stories in the cluster 162 may have a similarity with $c_i$ that is greater than $r_i$. The similarity may be determined according to the formula described with respect to FIG. 4. According to the above described formula, each of the clusters 162 may have a different diameter. The cluster diameter is described in greater detail in the paragraphs below.

It should be noted that $\lambda$ may be one of the parameters 166, whereby the cluster diameters may be customized for each particular implementation. The λ may be customized according to an expectation that 100(1−λ) percent of the stories 158 remaining (after removing noisy links) within each of the clusters 162 may be noisy.

Steps 520-550 may be repeated for each of the clusters 162. At step 525, the clusgator 154 may determine which of the clusters 162 in the same hierarchy level as the current cluster is most similar to the current cluster, i.

The clusgator 154 may determine the similarity between the cluster, i, and the other clusters 162 according to the formula described in FIG. 4, wherein the centroid of each of the clusters 162 is used in place of the term vectors. The cluster 162 that is most similar may be the cluster, j that has the highest similarity.

At step 530, if the centroids of the cluster i, and the cluster j, may not belong to each other's cluster, the method 500 may return to step 520. For the centroids of clusters i and j to be able to belong to each other, the centroids of clusters i and j may be within each other's diameter, and the similarity of the clusters i and j may be greater than the global threshold. In other words, $$\text{Sim}(c_i,c_j) > \max\{\min\{r_i,r_j\},\eta\}$$

If the centroids of the clusters i and j may belong to each other, at step 535, the clusters i and j may be merged.

At step 540, the centroid of the cluster 162 produced by merging the clusters i and j may be determined. The cluster 162 resulting from the merging of the clusters i and j may be referred to herein as the new cluster 162. At step 545, a simple diameter calculation may be used to determine the diameter of the new cluster 162. The simple diameter calculation may be used in place of the formula described at step 515 in order to attenuate computational costs of the method 500. The simple diameter calculation for the new cluster 162 may be $\min(r_i, r_j)$.

At step 550, the diameters of all the newly merged clusters 162 may be re-calculated according to the formula described with reference to step 515. The method 500 may then be repeated to create higher levels within the cluster hierarchy 160. In one implementation, at each recursion of the method 500, the global threshold parameter, α, may be reduced to account for the reduced similarity between the clusters 162 merged at higher and higher levels of the cluster hierarchy 160.

Figure 6:
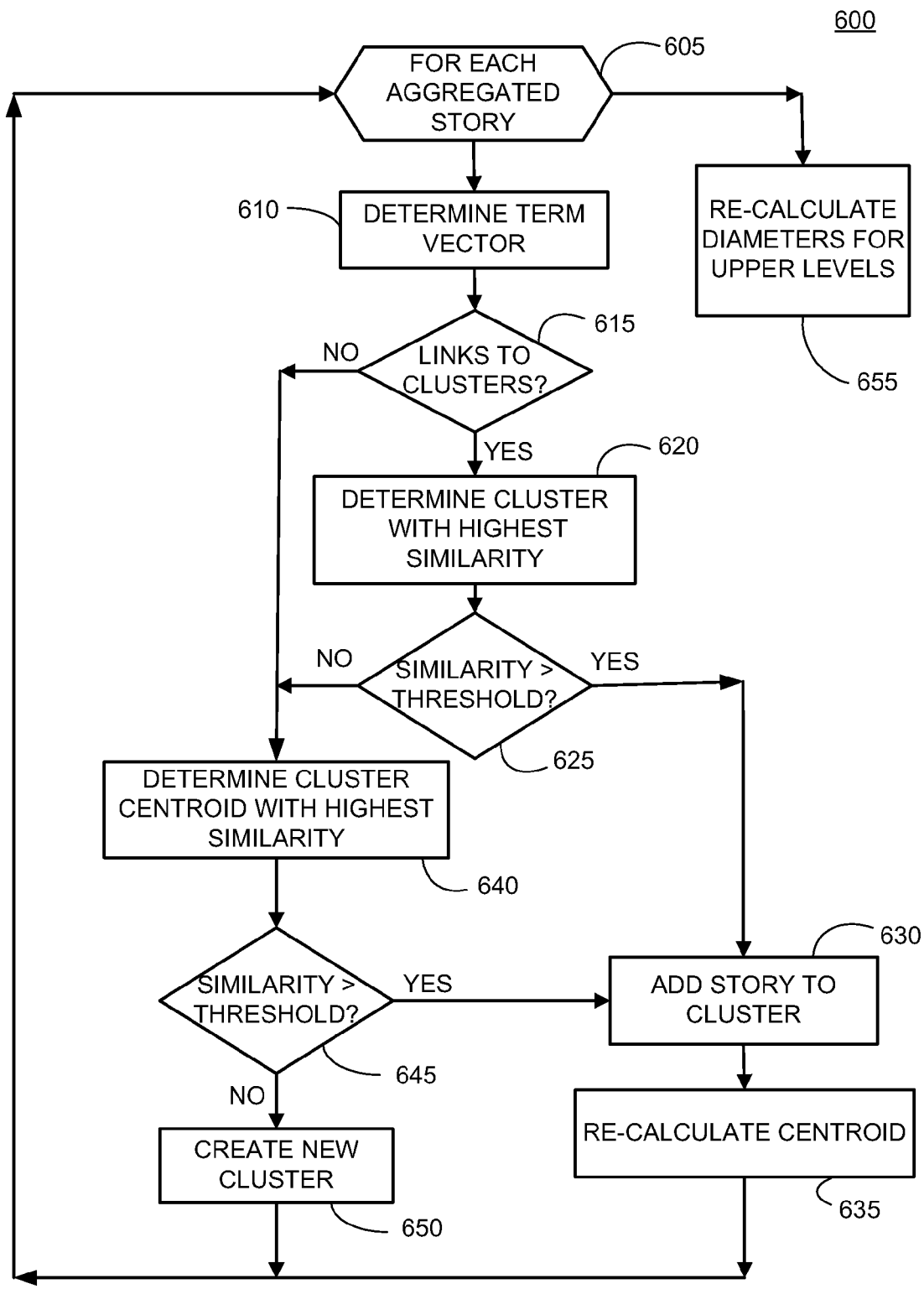
FIG. 6 illustrates a flow chart of a method for incremental clustering of the stories to the cluster hierarchy, in accordance with implementations described herein.

FIG. 6 illustrates a flow chart of a method 600 for incremental clustering of the stories 158 to the cluster hierarchy 160, in accordance with implementations described herein. The method 600 for incremental clustering may compare the stories 158 that are newly aggregated during the daily crawl to the clusters 162 at the lowest level of the cluster hierarchy 160. The comparison may be used to determine whether to add the stories 158 to the clusters. The method 500 may be performed by the clusgator 154.

Steps 605-635 may be repeated for each of the stories 158 newly aggregated during the daily crawl described with reference to FIG. 2. At step 610, the clusgator 154 may determine the term vector for the story 158.

At step 615, if the story 158 has links to the stories 158 within any of the clusters 162, at step 620, the cluster 162 containing the story 158 that is most similar may be determined.

At step 625, if the similarity between the story 158 and the centroid of the cluster 162 is greater than the global threshold, at step 630, the story 158 may be added to the cluster 162. As stated previously, the similarity may be determined according to the formula described with reference to FIG. 4. At step 635, the centroid for the cluster 162 may be re-calculated to account for adding the story 158 to the cluster 162.

Alternately, if the similarity of the story 158 to the cluster 162 does not exceed the global threshold, the method 600 may proceed to step 640. Similarly, if, at step 615, the story 158 does not have links to any of the clusters 162, the method 600 may proceed to step 640.

At step 640, the cluster 162 with the centroid most similar to the story 158 may be determined. If the similarity between the story 158 and the centroid is greater than the global threshold, the method 600 may proceed to step 630, described above.

If the similarity between the story 158 and the most similar centroid is not greater than the global threshold, at step 650, a new cluster may be created that contains the story 158. The method 500 may then return to step 605.

After all the stories 158 newly aggregated have been evaluated for incremental clustering, at step 655, the diameters of the clusters 162 in the upper levels of the cluster hierarchy 160 may be re-calculated. The diameters may be determined according to the formula described with reference to FIG. 5 at step 515.

Figure 7:
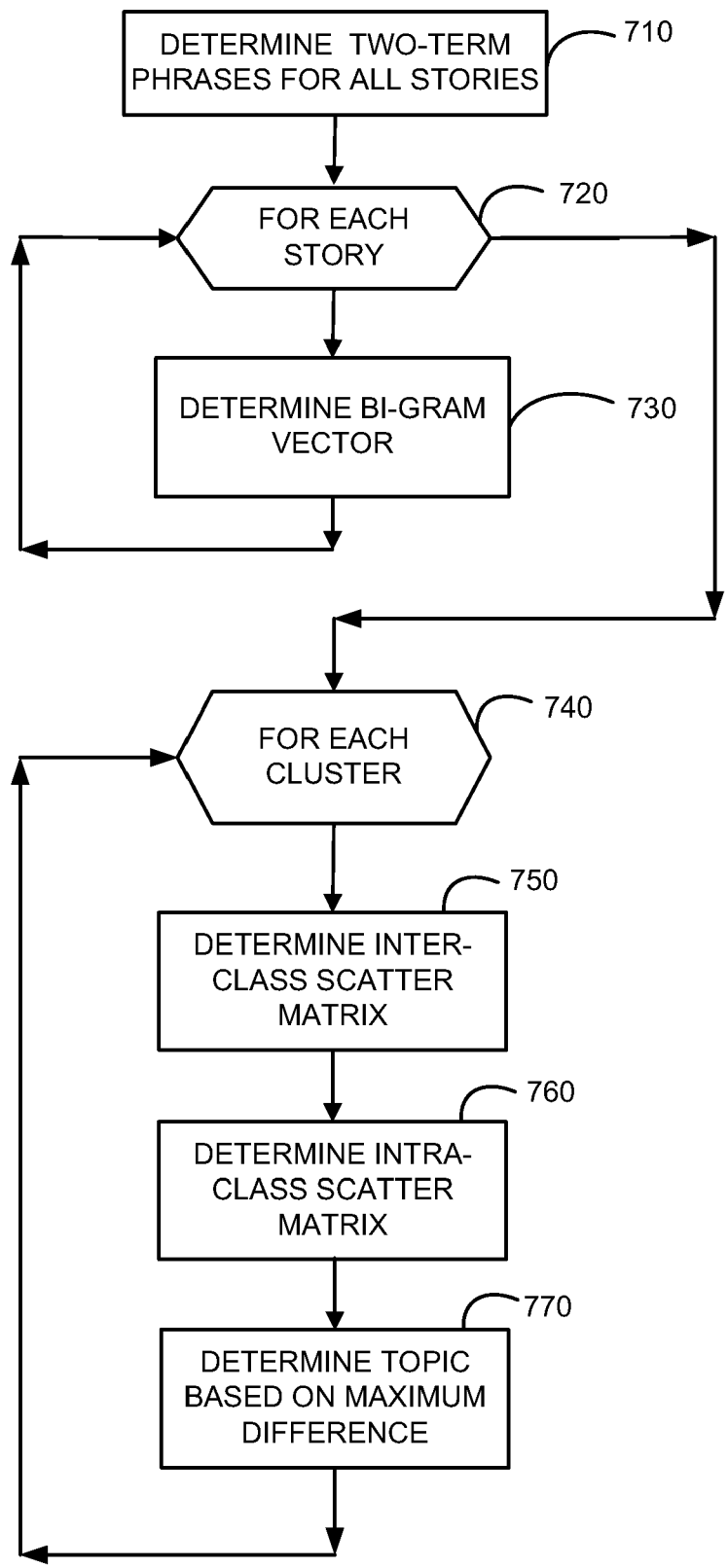
FIG. 7 illustrates a flow chart of a method for topic extraction, in accordance with implementations described herein.

FIG. 7 illustrates a flow chart of a method 700 for topic extraction, in accordance with implementations described herein. The method 700 may be performed by the clusgator 154 to determine the topic 154 for the clusters 162 in all levels of the cluster hierarchy 160.

At step 710, the clusgator 154 may determine all two-term phrases for all the stories 158. Steps 720-730 may then be repeated for each of the stories 158. At step 730, a bi-gram vector may be determined for the story 158. The bi-gram vector may be a vector of weights accorded to each two-term phrase in the story 158. The weights in the bi-gram vector may be determined according to the Term Frequency and Inverse Document Frequency algorithm.

Steps 740-770 may then be repeated for each of the clusters 162. At step 750, an inter-class scatter matrix may be determined for the cluster 162, referred to herein as cluster $G_i$. The inter-class scatter matrix may provide the average story distance between the cluster $G_i$ and all of the cluster's sibling clusters. The sibling clusters may be all the clusters 162 merged with the cluster $G_i$ to form an upper level cluster. The sibling clusters are also referred to herein as $G_i^j$. The average story distance may be an approximation of how many of the two-term phrases are shared between the cluster $G_i$ and its sibling clusters. In order to attenuate the likelihood that the topics 154 are duplicated, the clusgator 154 may maximize the average story distance between the cluster $G_i$ and its sibling clusters.

The inter-class scatter matrix for the cluster, $G_i$, may be determined as follows:

$$S_b(i) = (c_i - \bar{c}_l)(c_i - \bar{c}_l)^T$$

where $$\bar{c}_i = \frac{1}{\sum_{k=1}^{t} n_i^l} \sum_{j=1}^{t} n_i^j c_i^j$$

is the mean of all the siblings of the cluster $G_i$, and $n_i^j$ is the number of stories in one of the clusters $G_i^j$.

At step 760, the clusgator 154 may determine an intra-class scatter matrix for the cluster $G_i$. The intra-class scatter matrix may provide the average story distance between the all the children clusters within the cluster $G_i$. The children clusters may be all the clusters 162 that are merged to form the cluster $G_i$. Depending on the level of the cluster $G_i$ within the cluster hierarchy 160, the children clusters within the cluster $G_i$ may be stories 158 or clusters 162. In order to increase the likelihood that the topic 154 determined for the cluster $G_i$ relates to all the children clusters, the clusgator 154 may minimize the average story distance between the children clusters of the cluster $G_i$. The intra-class scatter matrix may be determined as follows:

$$S_w(i) = \frac{1}{n_i} \sum_{v_j \in G_i} (v_j - c_i)(v_j - c_i)^T$$

where $v_j$ may be the bi-gram vector of the stories 158 within the cluster $G_i$, or the centroid of bi-gram vectors for children clusters.

At step 770, the clusgator 154 may determine the topic 154 for the cluster 162. In order to maximize the average story distance between the sibling clusters and the cluster $G_i$, and minimize the average story distance between the children clusters of the cluster $G_i$, the clusgator 154 may determine the largest element in trace$\{S_b(i)-S_w(i)\}$. Because the trace function is the sum of the elements on the main diagonal (the diagonal from the upper left to the lower right), the largest element in trace$\{S_b(i)-S_w(i)\}$ may be determined by the largest element in $S_b(i)-S_w(i)$. As such, the clusgator 154 may determine that the topic 154 to be the two-term phrase in the associated bi-gram vector that is in the same dimension as the largest element in $S_b(i)-S_w(i)$.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for merging really simple syndication (RSS) feeds, comprising:
  (a) merging, by a computer, stories containing one or more terms into one or more clusters based on one or more links between the stories;
  (b) determining, by the computer, a cluster frequency with which the terms occur in each cluster;
  (c) determining, by the computer, a diameter for each cluster; and
  (d) determining, by the computer, a cluster that is most similar to one of the clusters based on the cluster frequency and further based on a cosine similarity between a centroid vector of the cluster that is most similar to the one of the clusters and a centroid vector of the one of the clusters; and
  (e) merging, by the computer, the most similar cluster with the one of the clusters based on the diameter and the cluster frequency.

2. The method of claim 1, further comprising:
  determining a story frequency with which the terms occur in each story;
  determining a similarity between two linked stories based on the story frequency; and
  splitting the two linked stories into two clusters based on the similarity.

3. The method of claim 2, wherein the story frequency comprises a term vector having a weight for each of the terms in the stories.

4. The method of claim 3, wherein the similarity is a cosine similarity between each term vector of the two linked stories.

5. The method of claim 3, wherein the weight for each of the terms is based on a term frequency and inverse document frequency algorithm.

6. The method of claim 1, wherein the cluster frequency comprises a centroid vector having an average weight for each of the terms in all stories within each cluster.

7. The method of claim 6, wherein the average weight for each of the terms in all stories within each cluster is based on a term frequency and inverse document frequency algorithm and an amount of stories within each cluster.

8. The method of claim 1, further comprising:
  (f) determining a cluster frequency of the merged clusters; and
  (g) determining a diameter of the merged clusters.

9. The method of claim 8, further comprising recursively repeating steps d-g for multiple levels of a cluster hierarchy based on the merged clusters.

10. At least one tangible computer-readable storage medium having stored thereon computer-executable instructions which, when executed by a computer, cause the computer to:
  (a) determine a story frequency with which one or more terms occur in one or more stories of one or more really simple syndication (RSS) feeds;
  (b) merge the stories into one or more clusters based on one or more links between the stories;
  (c) determine a similarity between two linked stories based on the story frequency;
  (d) split the two linked stories into two different clusters based on the similarity;
  (e) determine a cluster frequency with which the terms occur in each cluster;
  (f) determine a diameter for each cluster; and
  (g) determine a cluster that is most similar to one of the clusters based on the cluster frequency and further based on a cosine similarity between a centroid vector of the cluster that is most similar to the one of the clusters and a centroid vector of the one of the clusters; and (h) merge the most similar cluster with the one of the clusters based on the diameter and the cluster frequency.

11. The at least one tangible computer-readable storage medium of claim 10, wherein the story frequency comprises a term vector having a weight for each of the terms in the stories, and the weight is based on a term frequency and inverse document frequency algorithm.

12. The at least one tangible computer-readable storage medium of claim 11, wherein the similarity is a cosine similarity between each term vector of the two linked stories.

13. The at least one tangible computer-readable storage medium of claim 10, wherein the cluster frequency comprises a centroid vector having an average weight for each of the terms in all stories within each cluster.

14. The at least one tangible computer-readable storage medium of claim 13, wherein the average weight for each of the terms in all stories within each cluster is based on a term frequency and inverse document frequency algorithm, and an amount of stories within each cluster.

15. The at least one tangible computer-readable storage medium of claim 10, further comprising computer-executable instructions which, when executed by a computer, cause the computer to:
(i) determine a cluster frequency of the merged clusters; and
(j) determine a diameter of the merged clusters.

16. The at least one tangible computer-readable storage medium of claim 15, further comprising computer-executable instructions which, when executed by a computer, cause the computer to recursively repeat steps g-j for multiple levels of a cluster hierarchy based on the merged clusters.

17. A computer system, comprising:
a processor; and
a memory comprising program instructions executable by the processor to:
(a) determine a term vector for each of one or more stories of one or more really simple syndication (RSS) feeds, the term vector comprising a weight for each term in the stories, and the weight being based on a term frequency and inverse document frequency algorithm;
(b) merge the stories into one or more clusters based on one or more links between the stories;
(c) determine a story cosine similarity between two linked stories based on each term vector of the two linked stories;
(d) split the two linked stories into two different clusters based on the story cosine similarity;
(e) determine a centroid vector for each cluster that is an average of each term vector for all stories within each cluster;
(f) determine a diameter for each cluster; and
(g) determine a cluster that is most similar to one of the clusters based on a cluster cosine similarity of a centroid vector of the cluster that is most similar to the one of the clusters and a centroid vector of the one of the clusters; and
(h) merge the most similar cluster with the one of the clusters based on the diameter and the cluster cosine similarity.

18. The computer system of claim 17, wherein the memory further comprises program instructions executable by the processor to:
(i) determine a cluster frequency of the merged clusters;
(j) determine a diameter of the merged clusters; and
(k) recursively repeat steps g-j for multiple levels of a cluster hierarchy based on the merged clusters.

* * * * *